US010856208B2

(12) United States Patent
Balasingh et al.

(10) Patent No.: US 10,856,208 B2
(45) Date of Patent: Dec. 1, 2020

(54) IDENTIFICATION AND SUPPRESSION OF NETWORK BEACONS

(71) Applicant: Motorola Mobility LLC, Chicago, IL (US)

(72) Inventors: Binesh Balasingh, Naperville, IL (US); Mary Khun Hor-Lao, Chicago, IL (US); Ranjeet Gupta, Bengaluru (IN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/281,899

(22) Filed: Feb. 21, 2019

(65) Prior Publication Data

US 2020/0275343 A1    Aug. 27, 2020

(51) Int. Cl.
*H04W 40/24* (2009.01)
*H04W 80/02* (2009.01)
*H04W 72/04* (2009.01)
*H04W 84/18* (2009.01)

(52) U.S. Cl.
CPC ..... *H04W 40/244* (2013.01); *H04W 72/0446* (2013.01); *H04W 80/02* (2013.01); *H04W 84/18* (2013.01)

(58) Field of Classification Search
CPC ........... H04W 40/244; H04W 72/0446; H04W 80/02; H04W 84/18; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | | |
|---|---|---|---|---|
| 6,928,263 | B2* | 8/2005 | Blake | H04B 1/713 |
| | | | | 375/E1.033 |
| 7,587,207 | B2* | 9/2009 | Davies | H04B 1/713 |
| | | | | 455/456.1 |
| 9,037,194 | B2* | 5/2015 | Rosenbaum | H04W 16/28 |
| | | | | 455/562.1 |
| 10,638,401 | B2* | 4/2020 | Daoura | H04W 4/12 |
| 2014/0226639 | A1* | 8/2014 | Yi | H04W 74/04 |
| | | | | 370/336 |

OTHER PUBLICATIONS

"OMAPL138 Wireless Connectivity Release Notes Alpha release", Retrieved at: http://processors.wiki.ti.com/index.php/OMAPL138_Wireless_Connectivity_Release_Notes_Alpha_release—on Jul. 11, 2018, 8 pages.

* cited by examiner

*Primary Examiner* — Sharad Rampuria
(74) *Attorney, Agent, or Firm* — SBMC

(57) ABSTRACT

In embodiments of identification and suppression of network beacons, a wireless device scans for wireless network beacons and receives a beacon frame from a wireless network beacon. The wireless device identifies the beacon frame is from a network beacon of non-interest and suppresses the network beacon and terminates reception and processing of the beacon frame.

20 Claims, 6 Drawing Sheets

IDENTIFICATION AND SUPPRESSION OF NETWORK BEACONS

BACKGROUND

Wireless communication includes multiple standards, and different wireless devices are equipped with varying capabilities. As such, not all wireless devices are compatible with all standards of wireless communication. Many standards for wireless networking (Wi-Fi) are taking the next step to support mesh architectures and the internet of things (IOT). In a mesh network, a group of devices acts as a single Wi-Fi network, so there are multiple sources of Wi-Fi around an area instead of just a single router. These Wi-Fi sources are called Wi-Fi points or beacons, and since Wi-Fi is broadcast from each beacon, better coverage over a wider area can be provided. However, not all wireless devices support mesh networking and IOT capabilities. When one of these wireless devices is in range of a mesh network, the wireless device will continually scan the mesh network beacons and process an entire beacon frame received from the beacon even though it is of no use to the wireless device. This results in unnecessary power consumption and takes a toll on the wireless device battery. In addition, when a wireless device that does not support mesh-networking scans for nearby Wi-Fi networks, a nearby mesh network will still show up in the scan results even though the mesh network is not usable by the wireless device.

BRIEF DESCRIPTION OF THE DRAWINGS

Aspects of identification and suppression of network beacons are described with reference to the following Figures. The same numbers may be used throughout to reference similar features and components that are shown in the Figures.

DETAILED DESCRIPTION

Figure 1:
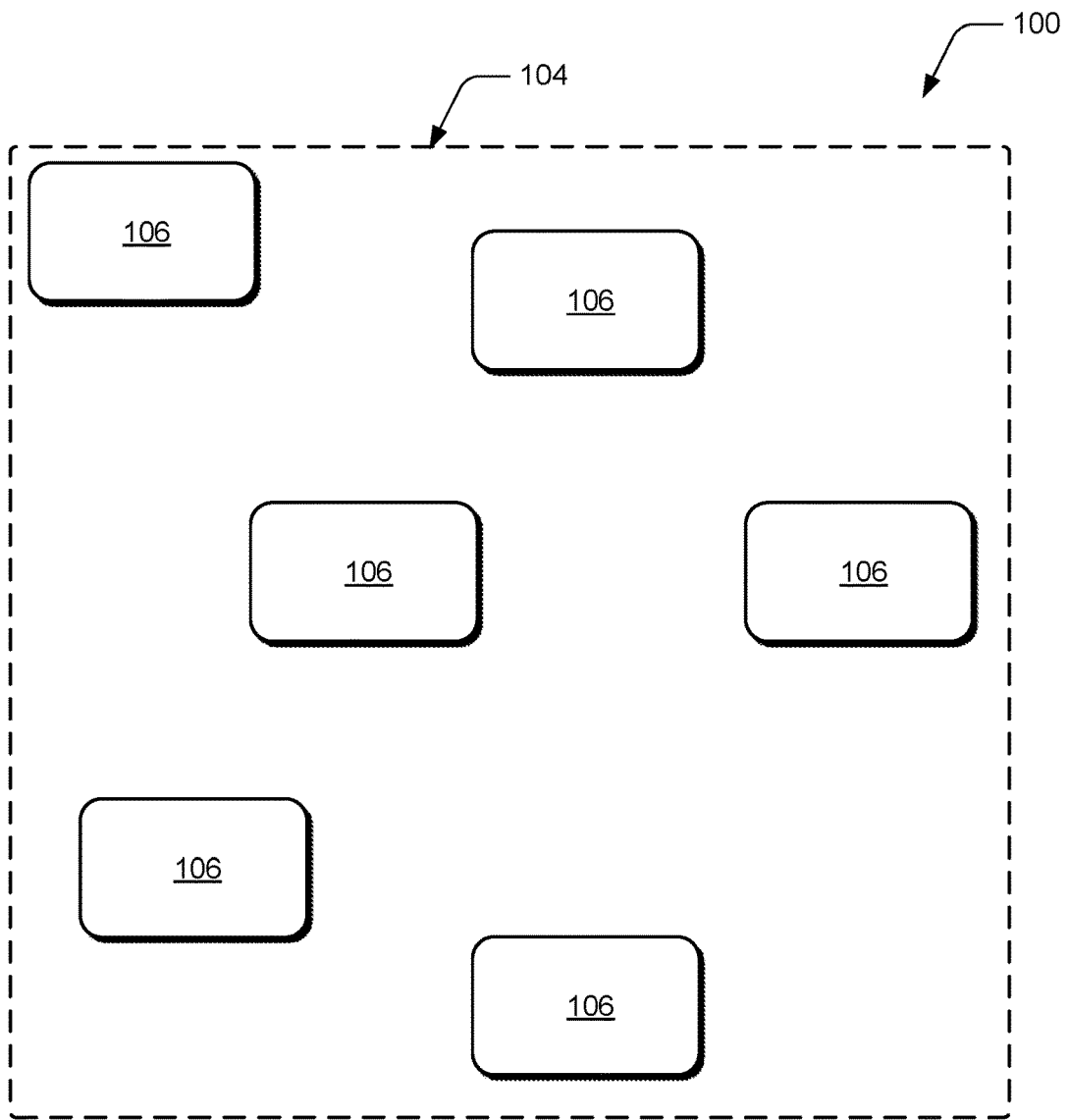
FIG. 1 illustrates an example environment in which aspects of identification and suppression of network beacons can be implemented.
Figure 1:
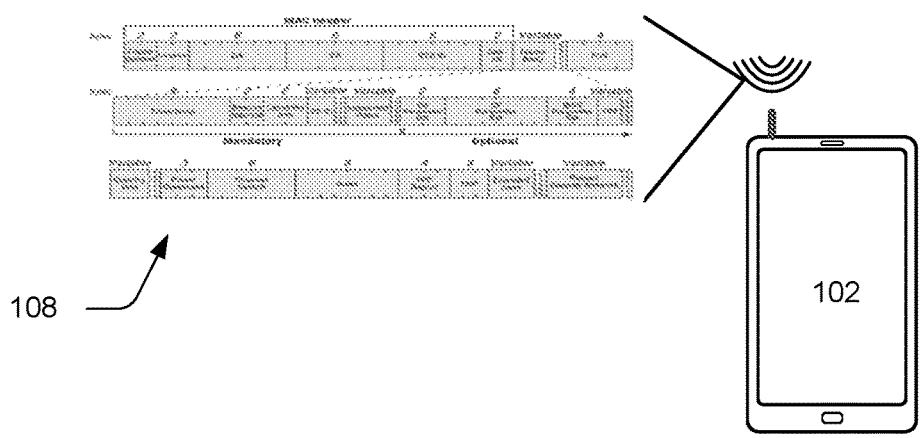

Aspects of identification and suppression of network beacons are described, where various features allow early beacon termination for beacons that are of non-interest to a wireless device. Generally, a wireless device scans for nearby wireless networks to join. In response, the wireless device receives a beacon frame from a nearby wireless network beacon or access point. Once the beacon frame is received, the wireless device determines if the beacon frame is from a compatible network beacon. Once it is determined that the beacon frame is from a compatible network beacon, the wireless device can receive and process the beacon frame. However, if the beacon frame is determined to be from a non-compatible network beacon, receiving and processing the beacon frame is useless and will lead to unnecessary battery consumption, as the wireless device will continue to process the unwanted beacon frame from the non-compatible network beacon and list it in its scan results even though the non-compatible network beacon is not of interest to the wireless device. Alternately or in addition, the beacon frame may be from a compatible network beacon, but still not be of interest to the wireless device. For example, a wireless device that supports mesh networking and is already connected to a mesh node in the mesh network, but does not remember the mesh network and thus keeps scanning for and processing the mesh beacons. These mesh beacons are of non-interest to the wireless device as it is already connected to a node in the mesh network. In another example, a decision has already been made for a mesh compatible wireless device to not join a particular mesh network. However, the wireless device will keep scanning and processing the mesh network beacons even though they are of non-interest to the wireless device. Thus, in aspects of identification and suppression of network beacons, the wireless device can filter out the network beacons of non-interest and terminate the processing of a beacon frame by dropping the remainder of the beacon frame and removing the network beacon from its scan results. Filtering out network beacons of non-interest will prolong the battery life of the wireless device by only processing beacon frames from network beacons that are compatible with and of interest to the wireless device.

In implementations, a wireless device that does not support mesh networking, such as one that is not part of the internet of things (IOTs), can identify and suppress beacon frames that are received from beacons from a mesh network, for example any IEEE 802 standard network that is mesh and/or IOT capable including but not limited to any IEEE 802.11, IEEE 802.15, IEEE 802.16, and IEEE 802.20 networks. In addition, the opposite is also true. That is, a wireless device that is capable of mesh networking or is IOT capable can identify and suppress beacon frames that are received from non-mesh network beacons or access points and network beacons that are not IOT capable. Further, a wireless device can identify and suppress beacon frames from any network beacon or node that is of non-interest to the wireless device. Thus, identification and suppression of network beacons provides a significant power saving advantage over conventional techniques by allowing a wireless device to return to a low power mode of operation before an entire beacon frame is received by the wireless device. This allows the wireless device to spend a greater portion of time in a low power mode and reduces the overall power consumptions of the wireless device.

Identification and suppression of network beacons are described herein primarily with respect to a wireless device that does not support mesh networking identifying and suppressing beacon frames that are received from beacons from a mesh network (e.g., IEEE 802.11s capable beacons) and vice versa. However, this is by way of example and not limitation. Techniques of identification and suppression of network beacons can also be used to identify and suppress any network beacon that is not of interest to a particular wireless device, for example any type of Wi-Fi, including but not limited to Wi-Fi Direct, Wi-Fi Passpoint, Wi-Fi Aware and the like. Alternately or in addition, techniques of identification and suppression of network beacons can also be used to identify and suppress beacons that use other types of wireless technology such as any type of Bluetooth. For example, a heart rate sensor with Bluetooth Low Energy (BLE) capability can broadcast heartrate data that has a universally unique identifier (UUID) in a beacon frame. Using techniques of identification and suppression of network beacons, a wireless device can determine if the heart rate sensor is of interest by looking at the UUID. If it is of interest the wireless device can receive and process the information. However, if the heart rate sensor is of non-interest, the wireless device can terminate reception and suppress the BLE heart rate sensor.

In aspects of identification and suppression of network beacons, a wireless device may awake from a low power mode of operation to receive a first portion of a beacon frame. A portion of the beacon includes information related to the type of network the network beacon belongs to, for example, a mesh network or a non-mesh network. If the information contained in the beacon frame indicates that the network beacon from which the beacon frame came is not compatible with or of non-interest to the wireless device, the wireless device can suppress the network beacon and terminate the reception and processing of the beacon frame.

Consider a wireless device that does not have mesh network capabilities. The wireless device may wake from a low power state to initiate a scan for nearby wireless networks. In response, the wireless device receives a beacon frame from a nearby network beacon or access point. Instead of processing the entire beacon frame from beginning to end, the wireless device first determines whether or not the beacon frame is from a mesh network beacon. If the beacon frame is from a mesh network beacon, the beacon frame is not usable as the wireless device is not mesh network capable. If the beacon frame is from a non-mesh network, the network is compatible with the wireless device.

In order to determine if the beacon frame is from a mesh network beacon, and therefore incompatible, the wireless device checks the beacon frame to see if it contains certain information. Such information can include, by way of example and not limitation a mesh destination medium access control (MAC) address and a mesh source address. Further, in at least some implementations, the wireless device can check to see if a mesh control bit is set. If the beacon frame contains any one or a combination of these, the wireless device determines that the beacon frame came from a mesh network beacon, which is not compatible with the wireless device. When this determination is made, the wireless device can terminate the processing of the beacon frame, and suppress the network beacon from a scan list. This process is described in further detail below with regard to FIG. 5.

Alternately, if the wireless device is mesh network compatible, the same process described above may be used to determine whether or not a beacon frame is from a mesh network beacon or a non-mesh access point. In this case, if the wireless device determines that the beacon frame is from a mesh network beacon, the wireless device may process the entire beacon frame. If the wireless device determines that the beacon frame is from a non-mesh network access point, the wireless device can terminate the processing of the beacon frame and suppress the network access point from the scan list.

While features and concepts of identification and suppression of network beacons can be implemented in any number of different devices, systems, environments, and/or configurations, aspects of identification and suppression of network beacons are described in the context of the following example devices, systems, and methods.

Example Operating Environment

FIG. 1 illustrates an example environment 100 in which aspects of identification and suppression of network beacons can be implemented. The example environment 100 includes a wireless device 102, a wireless network of devices 104 including multiple devices 106, and a beacon frame 108. The wireless device 102 scans for nearby wireless network beacons and in return receives a beacon frame 108 from a wireless network beacon within range. For example, the wireless network 104 may be a wireless mesh network where the multiple devices 106 function as Wi-Fi nodes, or wireless mesh network beacons, that can send out a beacon frame such as beacon frame 108 which the wireless device 102 receives. Alternately or in addition, wireless network 104 may be an IOT network, for instance a smart-home or other type of structure with any number of mesh network devices 106 that are configured for communication in a mesh network. One of the mesh network devices 106 may send the beacon frame 108 which wireless device 102 receives. If wireless device 102 is not a mesh network device, the beacon frame 108 received from a mesh network device 106 will be meaningless to wireless device 102. Conventionally, wireless device 102 would process the entire beacon frame 108 even though it is not usable by wireless device 102. However, techniques to identify and suppress network beacons enable the wireless device 102 to identify the beacon frame 108 as a mesh network beacon frame, and suppress the network beacon and terminate the reception and processing of the mesh network beacon frame.

Alternately or in addition, the wireless device 102 may represent a wireless mesh device and the wireless network 104 may represent a non-mesh wireless network. In this embodiment, the beacon frame 108 represents a non-mesh beacon frame, and is not usable by wireless mesh device 102. In this case, techniques to identify and suppress network beacons enable the wireless mesh device 102 to terminate the reception and processing of the non-mesh network beacon frame 108 upon determining that the beacon frame is from a non-compatible non-mesh network beacon.

In still another example embodiment, wireless device 102 may be mesh network compatible and already be connected to the wireless mesh network 104, thus having no need to keep receiving and processing beacon frame 108 from the mesh network devices 106. Techniques to identify and suppress network beacons enable the wireless device 102 to identify the beacon frame 108 as a mesh network beacon frame from a mesh network 104 that the wireless device is already connected to and suppress the network beacon and terminate the reception and processing of the mesh network beacon frame because it is of non-interest.

Example Beacon Frames

Figure 2A:
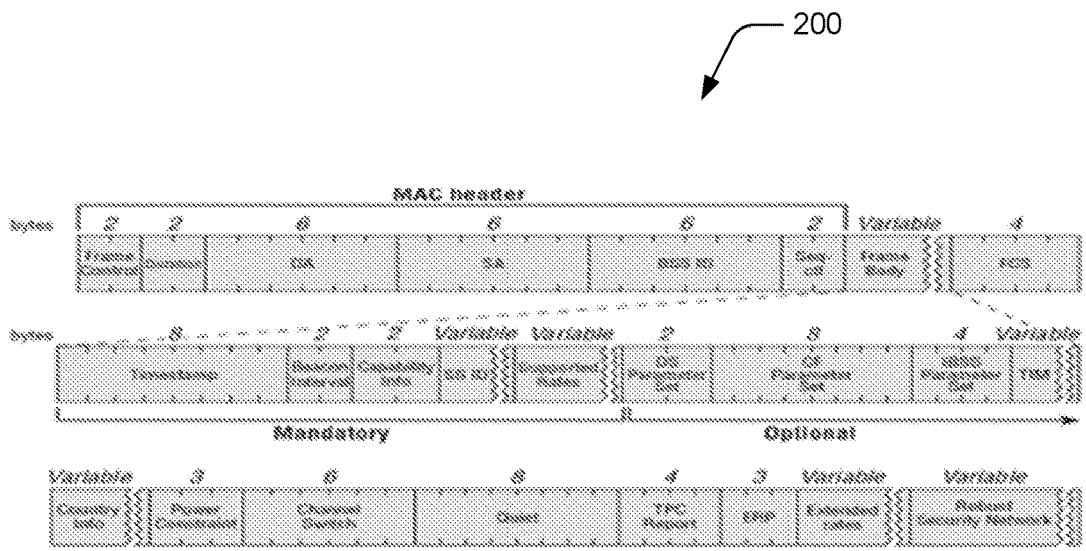
FIG. 2a illustrates a traditional beacon frame.

FIG. 2a illustrates a traditional wireless local area network (WLAN) beacon frame that specifies an over-the-air interface between wireless devices. The traditional beacon frame is used by any device that supports IEEE 802.11 protocol.

Figure 2B:
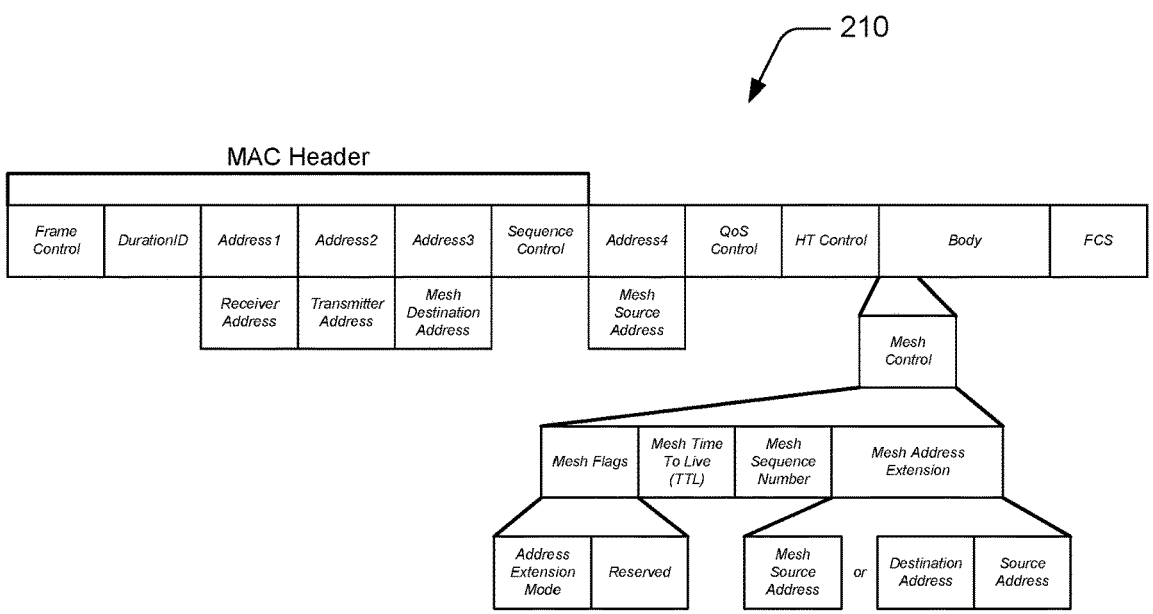
FIG. 2b illustrates a traditional beacon frame that indicates it supports a mesh network.

FIG. 2b illustrate an example of an IEEE 802.11s beacon frame, or traditional beacon frame that supports a mesh network. For instance, in the MAC header, Address3 (shown as BSS ID in FIG. 2a) is used as the Mesh Destination Address. The first bytes of the Frame Body shown in FIG. 2a are used as Address4 or the Mesh Source Address of FIG. 2b. Finally, also contained in the Frame Body of FIG. 2a, is a Mesh Control byte containing a mesh control bit that, when set, indicates that the beacon frame is a mesh network beacon frame as shown in FIG. 2b. The Mesh Destination Address, the Mesh Source Address, and the mesh control bit can each be used, separately or in any combination, to determine whether a network beacon that sent the beacon frame supports mesh networking. By identifying a beacon frame as either a mesh beacon or a non-mesh beacon, a wireless device can determine if the beacon frame is from a compatible network. If not, the wireless device can suppress the network beacon and terminate the reception and processing of the beacon frame.

Example Methods

Figure 3:
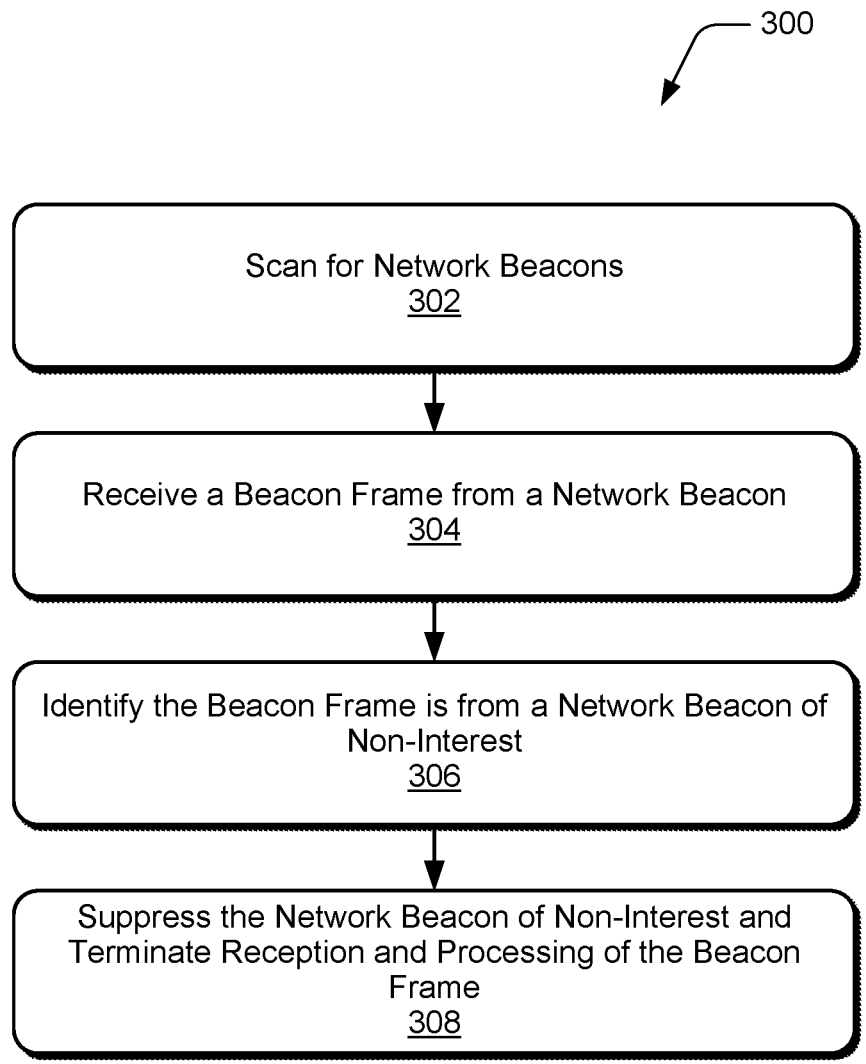
FIG. 3 illustrates an example method of identification and suppression of network beacons in accordance with one or more implementations described herein.
Figure 4:
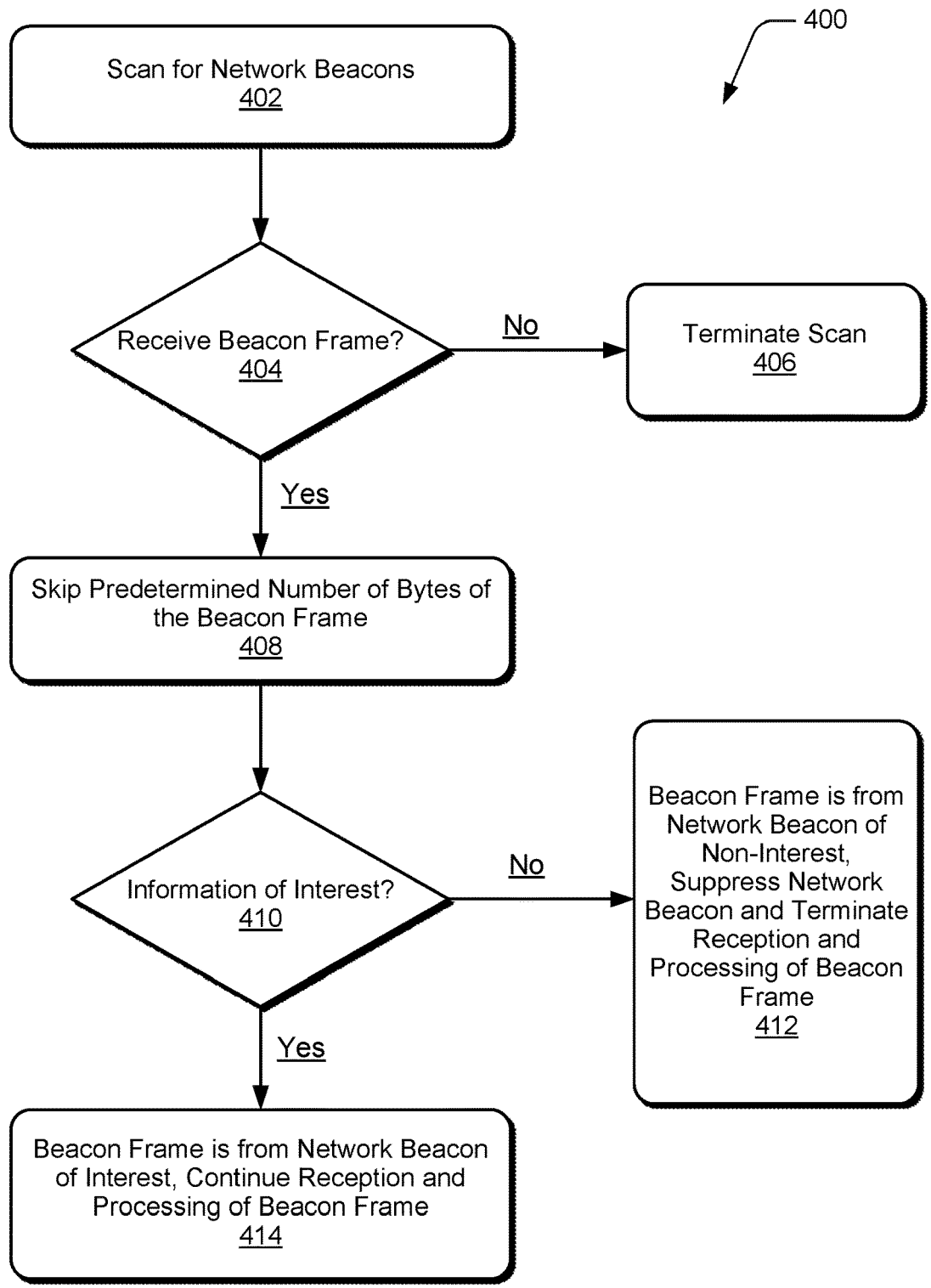
FIG. 4 illustrates an example method of identification and suppression of network beacons in accordance with one or more implementations described herein.
Figure 5:
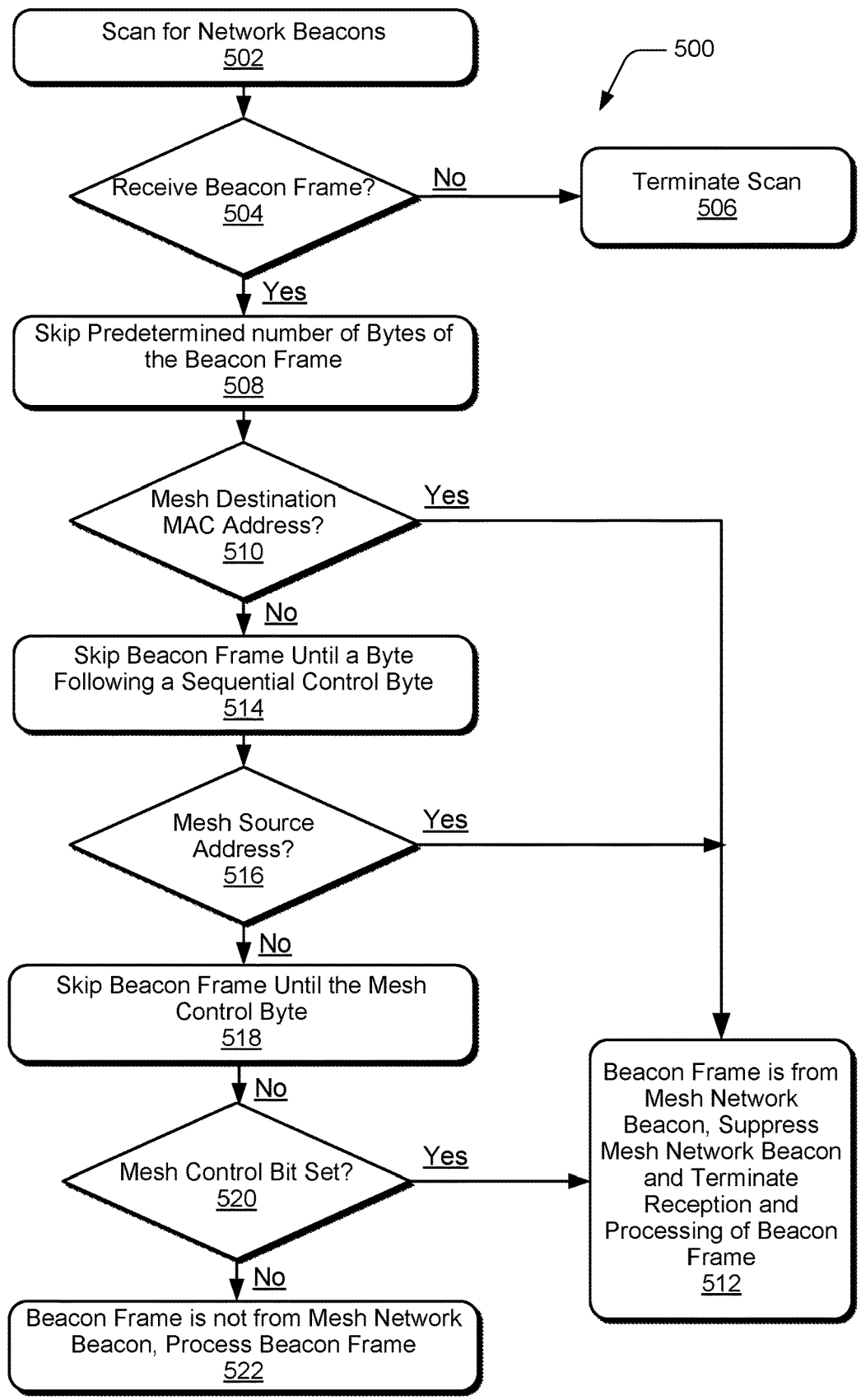
FIG. 5 illustrates an example method of identification and suppression of network beacons in accordance with one or more implementations described herein.

Example methods 300, 400 and 500 are described, respectively, with reference to FIGS. 3, 4, and 5 in accordance with implementations of identification and suppression of network beacons. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 3 illustrates an example method 300 for identifying and suppressing network beacons as described herein, in conjunction with a wireless device. The order in which the method is described is not intended to be construed as a limitation, and any number or combination of the described method operations can be performed in any order to perform a method, or an alternate method.

At 302, a scan for network beacons is initiated by a wireless device. For example, the wireless device such as wireless device 102, shown in FIG. 1, initiates a scan for nearby network beacons 106 in an attempt to join a wireless network 104. If the wireless device 102 is in low power mode, it may wake up in order to initiate the scan for network beacons.

At 304, a beacon frame is received from a network beacon. For example, wireless device 102 will receive a beacon frame 108 from a nearby network beacon 106 in response to the network beacon scan.

At 306, the beacon frame is identified as being from a network beacon of non-interest. For example, a wireless device that is not mesh compatible scans for nearby network beacons and receives in response, a beacon frame from a mesh network beacon. The wireless device determines that the beacon frame is from a mesh network beacon, and thus of non-interest to the wireless device. This process is described in further detail below with regard to FIG. 4.

At 308, the network beacon of non-interest is suppressed and reception and processing of the beacon frame is terminated. For example, once a beacon frame is identified as a beacon frame of non-interest, there is no need to continue receiving and processing beacon frames from the network beacon of non-interest as it is not of use by the wireless device. Thus, the beacon frame can be terminated early without processing the entire beacon frame and the network beacon of non-interest can be removed from a list of scan results.

FIG. 4 illustrates an example method 400 for identifying and suppressing network beacons as described herein. The order in which the method is described is not intended to be construed as a limitation, and any number of combination of the described method operations can be performed in any order to perform a method, or an alternate method.

At 402, a scan for network beacons is initiated by a wireless device and at 404, a determination is made whether or not a beacon frame is received from a nearby network beacon. If a beacon frame is not received the scan is terminated at 406 and the method can return to 402 as appropriate. If a beacon frame is received, beacon frame processing begins at 408 as detailed below.

At 408, a predetermined number of bytes of the beacon frame are skipped and at 410, a determination is made whether or not the next bytes, after the skipped bytes of the beacon frame, contain information of interest. If the beacon frame does not contain information of interest, the network beacon is identified as belonging to a network beacon of non-interest, and the network beacon is suppressed and the processing of the beacon frame is terminated at 412. If, on the other hand, the beacon frame does contain information of interest, the beacon frame is from a network beacon of interest, and reception and processing of the beacon frame continues at 414.

FIG. 5 illustrates an example method 500 for identifying and suppressing network beacons as described herein. In particular, FIG. 5 illustrates an example method of identifying and suppressing a mesh network beacon that is determined to be of non-interest to a wireless device using techniques of identification and suppression of network beacons. The order in which the method is described is not intended to be construed as a limitation, and any number or combination of the described method operations can be performed in any order to perform a method, or an alternate method.

At 502, a scan for network beacons is initiated by a wireless device and at 504, a determination is made whether or not a beacon frame is received from a nearby network beacon. If a beacon frame is not received, the scan is terminated at 506 and the method can return to 502 as appropriate. If a beacon frame is received, beacon frame processing begins at 508 as detailed below.

In some embodiments, beacon frame processing includes skipping, at 508, a predetermined number of bytes of the beacon frame. In one example, the predetermined number of bytes is 14. At 510, a determination is made whether or not the next bytes, after the skipped bytes of the beacon frame, contain a mesh destination MAC address. For example, if the BSS ID, shown in FIG. 2a, is anything other than ffffffffffff, then the beacon frame is form a mesh network beacon and the BSS ID is the Mesh Destination Address, shown in FIG. 2b. If the beacon frame does contain a mesh destination MAC address, the network beacon is identified as belonging to a mesh network, and the network beacon is suppressed and the processing of the beacon frame is terminated at 512. If, on the other hand, the beacon frame does not contain a mesh destination MAC address, processing of the beacon frame continues at 514.

At 514, the beacon frame is skipped until a byte following a sequential control byte is encountered. At 516, a determination is made whether or not the next bytes contain a mesh source address. For example, if the Address4 field, shown in FIG. 2b, is anything other than ffffffffffff, then the beacon frame is form a mesh network beacon and the Address4 field contains a mesh source address. If the next byte does contain a mesh source address, the network beacon is identified as belonging to a mesh network, and the network beacon is suppressed and the processing of the beacon frame is terminated at 512. If, on the other hand, the beacon frame does not contain a mesh source address, processing of the beacon frame continues at 518.

At 518, the beacon frame is skipped until a mesh control byte is encountered. At 520, a determination is made whether or not a mesh control bit is set in the mesh control byte. For example, 28 bytes from the start of the frame, is the QoS control field, shown in FIG. 2b. If bit 8 of the QoS control field is set to 1, then the first byte of the body is the mesh control byte, as shown in FIG. 2b. If the mesh control bit is set, the network beacon is identified as belonging to a mesh network, and the network beacon is suppressed and the processing of the beacon frame is terminated at 512. If the mesh control bit is not set then the network beacon is identified as not coming from a mesh network and the beacon frame is processed at 522. For example, if the beacon is identified as not coming from a mesh network, the beacon is reported to the host software and displayed to a user as a mesh node that the user can connect the wireless device to.

Example Wireless Device

Figure 6:
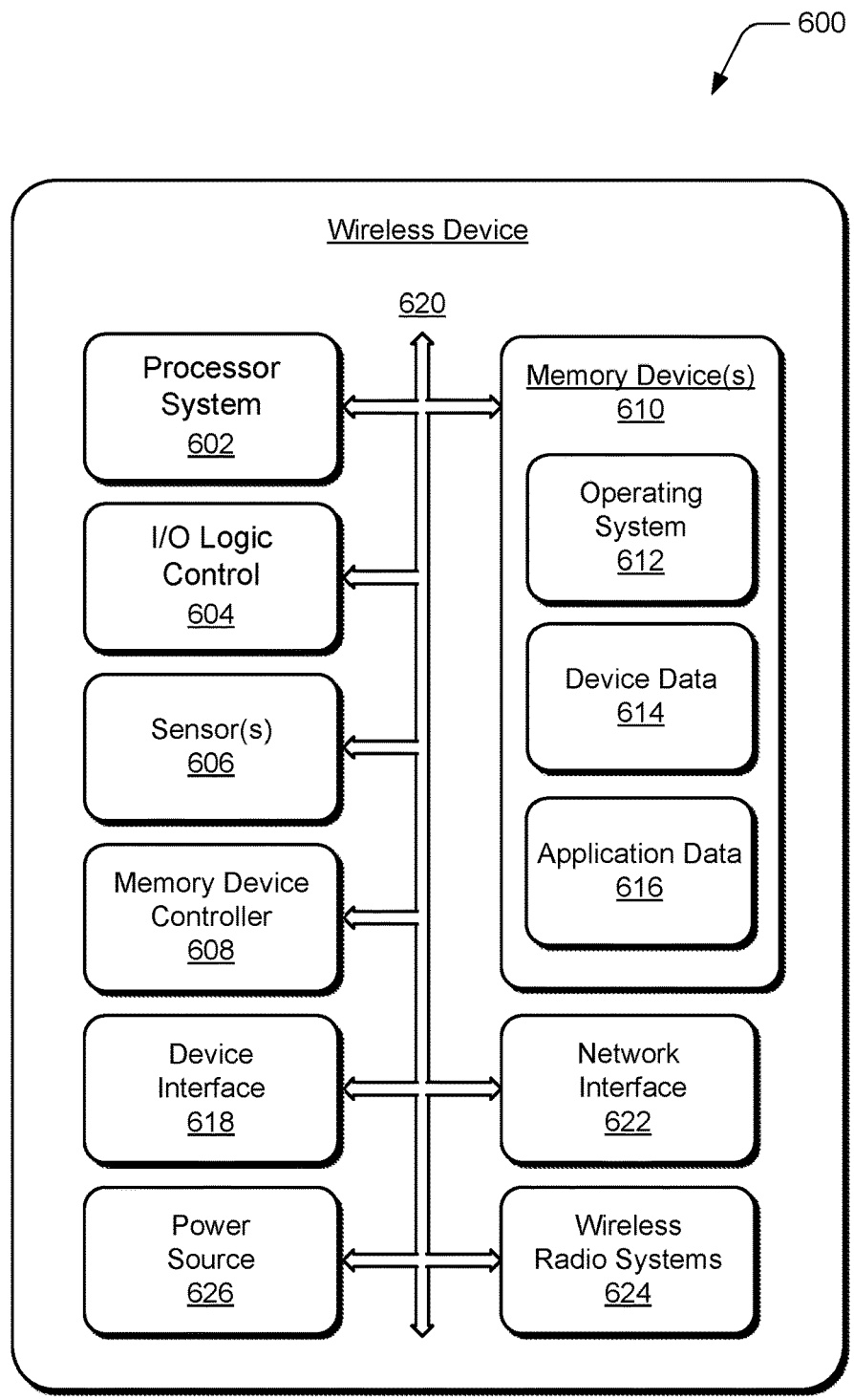
FIG. 6 illustrates various components of an example wireless device that can implement aspects of identification and suppression of network beacons.

FIG. 6 illustrates an example wireless device 600 that can be implemented as any device in accordance with one or more embodiments of identification and suppression of network beacons. The example wireless device 600 can be implemented as any wireless described with reference to the previous FIGS. 1-5, such as any type of mobile device, mobile phone, client device, wearable device, tablet, computing, communication, entertainment, gaming, media playback, and/or other type of wireless electronic device. The wireless device 600 can be integrated with electronic circuitry, microprocessors, memory, input output (I/O) logic control, communication interfaces and components, as well as other hardware, firmware, and/or software to implement the wireless device in a wireless network (WLAN).

The wireless device 600 includes a processing system 602 of one or more processors (e.g., any of microprocessors, controllers, and the like) that process executable instructions. The wireless device also includes an input-output (I/O) logic control 604 (e.g., to include electronic circuitry). The microprocessor can include components of an integrated circuit, programmable logic device, a logic device formed using one or more semiconductors, and other implementations in silicon and/or hardware, such as a processor and memory system implemented as system-on-chip (SoC). Alternatively or in addition, the wireless device can be implemented with any one or combination of software, hardware, firmware, or fixed logic circuitry that may be implemented with processing and control circuits.

The wireless device 600 includes one or more sensors 606 that can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 606 may include any one or a combination of temperature sensors, humidity sensors, hazard-related sensors, other environmental sensors, accelerometers, microphones, optical sensors up to and including cameras (e.g., charged coupled-device or video cameras), active or passive radiation sensors, GPS receivers, and radio frequency identification detectors. In implementations, the wireless device 600 may include one or more primary sensors, as well as one or more secondary sensors, such as primary sensors that sense data central to the core operation of the wireless device (e.g., sensing a temperature in a thermostat or sensing smoke in a smoke detector), while the secondary sensors may sense other types of data (e.g., motion, light or sound), which can be used for energy-efficiency objectives or smart-operation objectives.

The wireless device 600 includes a memory device controller 608 and computer-readable storage memory 610 (e.g., memory devices) that enable data storage, such as data storage devices that can be accessed by a computing device, and that provide persistent storage of data and executable instructions (e.g., software applications, programs, functions, and the like). Examples of the computer-readable storage memory 610 include volatile memory and non-volatile memory, fixed and removable media devices, and any suitable memory device or electronic data storage that maintains data for computing device access. The wireless device 600 can also include various firmware and/or software, such as an operating system 612 that is maintained as computer executable instructions by the memory and executed by a microprocessor.

The computer-readable storage memory 610 provides data storage mechanisms to store the device data 614, other types of information and/or data, and various device applications 616 (e.g., software applications). The device applications may also include a device manager, such as any form of a control application, software application, signal processing and control module, code that is native to a particular device, a hardware abstraction layer for a particular device, and so on.

The wireless device 600 includes a device interface 618. The device interface may receive input from a user and/or provide information to the user (e.g., as a user interface). The device interface 618 may also include mechanical or virtual components that respond to user input. For example, the user can mechanically move a sliding or rotatable component, or the motion along a touchpad may be detected, and such motions may correspond to a setting adjustment of the wireless device. The device interface 618 may also receive inputs from any number of peripherals, such as buttons, a keypad, a switch, a microphone, and an imager (e.g., a camera device).

The network interface 622, enables wireless communication of device data 614 with other devices, and an external network interface for network communication, such as via the Internet. The wireless radio systems may include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, and wireless metropolitan area network (WMAN) radios compliant with various IEEE 802.16 (WiMAX™) standards for network data communication. Each of the different radio systems can include a radio device, antenna, and chipset that are implemented for a particular wireless communications technology. The wireless device 600 also includes a power source 626, such as a battery and/or to connect to line voltage. An AC power source may also be used to charge the battery of the wireless device.

Although implementations of identification and suppression of network beacons have been described in language specific to features and/or methods, the subject of the appended claims is not necessarily limited to the specific features or methods described. Rather, the features and methods are disclosed as example implementations of identification and suppression of network beacons, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method comprising: scanning for wireless network beacons; receiving a beacon frame from a wireless network beacon; identifying that the beacon frame is from a network beacon of non-interest; and suppressing the network beacon of non-interest and terminating reception and processing of the beacon frame.

Alternatively or in addition to the above-described method, any one or combination of: the identifying further comprises identifying that the network beacon of non-interest is a mesh network beacon. The method further comprising providing a list of scan results in which the network beacon of non-interest is filtered out. The identifying further comprises identifying that the network beacon of non-interest is one of an IEEE 802.11 compatible mesh network beacon, an IEEE 802.15 compatible network beacon, an IEEE 802.16 compatible network beacon, or an IEEE 802.20 compatible network beacon. The identifying further comprises identifying that the network beacon of non-interest is an IEEE 802.11s compatible mesh network beacon and further comprises at least one of: skipping a predetermined number of bytes of the beacon frame and determining that the beacon frame contains a mesh destination MAC address; skipping the beacon frame until a byte following a sequential control byte is encountered and determining that next bytes of the beacon frame contain a mesh source address; and skipping the beacon frame until a mesh control byte is encountered and determining that a mesh control bit is set. The determining further comprises determining that the network beacon of non-interest is a non-mesh network beacon.

A method for identification and suppression of network beacons of non-interest comprising: scanning for wireless network beacons; receiving a beacon frame from a wireless network beacon; skipping a predetermined number of bytes of the beacon frame and determining whether or not the beacon frame contains information of interest, when the beacon frame does not contain information of interest, identifying the beacon frame as being from a network beacon of non-interest, suppressing the network beacon of non-interest, and terminating reception and processing of the beacon frame; and when the beacon frame does contain information of interest, identifying the beacon frame as being from a network beacon of interest, and continuing reception and processing of the beacon frame.

Alternatively or in addition to the above described method, any one or combination of: waking from a low power mode prior to scanning for wireless network beacons, and returning to the low power mode after suppressing the network beacon of non-interest and terminating reception and processing of the beacon frame. The method further comprising providing a list of scan results in which the network beacon of non-interest is filtered out.

A wireless device comprising: a network interface configured for communication in a wireless network; a memory and processor system configured to: scan for wireless network beacons; receive a beacon frame from a wireless network beacon; identify the beacon frame is from a network beacon of non-interest; and suppress the network beacon of non-interest and terminate reception and processing of the beacon frame.

Alternatively or in addition to the above-described system, any one or combination of: the memory and processor system is further configured to provide a list of scan results in which the network beacon of non-interest is filtered out. The memory and processor system is further configured to identify the beacon frame is from a mesh network beacon. The memory and processor system is further configured to identify the beacon frame is from one of an IEEE 802.11 compatible network beacon, an IEEE 802.15 compatible network beacon, an IEEE 802.16 compatible network beacon, or an IEEE 802.20 compatible network beacon. The memory and processor system to identify that the beacon frame received is from a mesh network beacon is further configured to skip a predetermined number of bytes of the beacon frame and determine whether or not the beacon frame contains a mesh destination MAC address, skip the beacon frame until a byte following a sequential control byte is encountered and determine whether or not next bytes of the beacon frame contain a mesh source address, and skip the beacon frame until a mesh control byte and determine whether or not a mesh control bit is set. The memory and processor system is further configured to suppress the mesh network beacon, terminate reception and processing of the beacon frame, and return to a low power mode. The memory and processor system are further configured to identify the beacon frame is from a non-mesh network beacon.

We claim:

1. A method implemented by a wireless device, the method comprising:
   scanning for wireless network beacons;
   receiving a beacon frame from a wireless network beacon;
   identifying that the beacon frame is from a wireless network beacon that is non compatible with the wireless device,
   the wireless network beacon being a compatible mesh network beacon and the identifying by skipping the beacon frame until a mesh control byte is encountered and
   determining that a mesh control bit is set; and
   suppressing the wireless network beacon that is non-compatible and terminating reception and processing of the beacon frame.

2. The method as recited in claim 1, wherein the identifying further comprises identifying that the wireless network beacon that is non compatible is a mesh network beacon.

3. The method as recited in claim 1, further comprising providing a list of scan results in which the wireless network beacon that is non-compatible is filtered out.

4. The method as recited in claim 1, wherein the identifying further comprises identifying that the wireless network beacon that is non compatible is one of an IEEE 802.11 compatible network beacon, an IEEE 802.15 compatible network beacon, an IEEE 802.16 compatible network beacon, or an IEEE 802.20 compatible network beacon.

5. The method as recited in claim 1, wherein the identifying further comprises identifying that the wireless network beacon that is non compatible is an IEEE 802.11s compatible mesh network beacon by skipping a predetermined number of bytes of the beacon frame and determining that the beacon frame contains a mesh destination MAC address.

6. The method as recited in claim 1, wherein the identifying further comprises identifying that the wireless network beacon that is non compatible is an IEEE 802.11s compatible mesh network beacon by skipping the beacon frame until a byte following a sequential control byte is encountered and determining that next bytes of the beacon frame contain a mesh source address.

7. The method as recited in claim 1, further comprising:
   waking from a low power mode prior to the scanning for the wireless network beacons; and returning to the low power mode after the suppressing the wireless network beacon that is non-compatible and terminating the reception and processing of the beacon frame.

8. A method implemented by a wireless device for identification and suppression of network beacons of non-interest comprising:
scanning for wireless network beacons;
receiving a beacon frame from a wireless network beacon;
skipping a predetermined number of bytes of the beacon frame and determining whether the beacon frame is from a wireless network beacon that is compatible with the wireless device as a compatible mesh network beacon,
the determining by skipping until a mesh control byte is encountered and determining that a mesh control bit is set;
responsive to the determining that the beacon frame is from a wireless network beacon that is not compatible with the wireless device,
suppressing the non-compatible wireless network beacon, and terminating reception and processing of the beacon frame; and
responsive to the determining that the beacon frame is from the wireless network beacon that is compatible with the wireless device, continuing the reception and the processing of the beacon frame.

9. The method as recited in claim 8, further comprising waking from a low power mode prior to the scanning for the wireless network beacons, and returning to the low power mode after the suppressing the non-compatible wireless network beacon and terminating reception and processing of the beacon frame.

10. The method as recited in claim 8, further comprising providing a list of scan results in which the non-compatible wireless network beacon is filtered out.

11. A wireless device comprising:
a network interface configured for communication in a wireless network;
a memory and processor system configured to:
scan for wireless network beacons;
receive a beacon frame from a wireless network beacon;
identify that the beacon frame is from a wireless network beacon that is non compatible with the wireless device, the wireless network beacon being a compatible mesh network beacon and identify that the beacon frame is from the compatible mesh network beacon by the beacon frame being skipped until a mesh control byte is encountered and
a determination that a mesh control bit is set; and
suppress the wireless network beacon that is non-compatible and terminate reception and processing of the beacon frame.

12. The wireless device as recited in claim 11, wherein the memory and processor system is further configured to provide a list of scan results in which the wireless network beacon that is non-compatible is filtered out.

13. The wireless device as recited in claim 11, wherein the memory and processor system is further configured to identify that the beacon frame is from a mesh network beacon.

14. The wireless device as recited in claim 11, wherein the memory and processor system is further configured to identify that the beacon frame is from one of an IEEE 802.11 compatible network beacon, an IEEE 802.15 compatible network beacon, an IEEE 802.16 compatible network beacon, or an IEEE 802.20 compatible network beacon.

15. The wireless device as recited in claim 13, wherein, to identify that the beacon frame is from the mesh network beacon, the memory and processor system is further configured to skip a predetermined number of bytes of the beacon frame and determine that the beacon frame contains a mesh destination MAC address.

16. The wireless device as recited in claim 13, wherein, to identify that the beacon frame is from the mesh network beacon, the memory and processor system is further configured to:
skip a predetermined number of bytes of the beacon frame and determine that the beacon frame does not contain a mesh destination MAC address; and
skip the beacon frame until a byte following a sequential control byte is encountered and determine that next bytes of the beacon frame contain a mesh source address.

17. The wireless device as recited in claim 13, wherein, to identify that the beacon frame is from the mesh network beacon, the memory and processor system is further configured to:
skip a predetermined number of bytes of the beacon frame and determine that the beacon frame does not contain a mesh destination MAC address; and
skip the beacon frame until a byte following a sequential control byte is encountered and determine that next bytes of the beacon frame do not contain a mesh source address.

18. The wireless device as recited in claim 17, wherein the memory and processor system is further configured to suppress the mesh network beacon, terminate reception and processing of the beacon frame, and return to a low power mode.

19. The method as recited in claim 8, further comprising identifying that the wireless network beacon that is non compatible with the wireless device is one of an IEEE 802.11 compatible network beacon, an IEEE 802.15 compatible network beacon, an IEEE 802.16 compatible network beacon, or an IEEE 802.20 compatible network beacon.

20. The method as recited in claim 8, further comprising identifying that the wireless network beacon that is non compatible with the wireless device is an IEEE 802.11s compatible mesh network beacon, the identifying by skipping a predetermined number of bytes of the beacon frame and determining that the beacon frame contains a mesh destination MAC address.

* * * * *